US008718920B2

(12) United States Patent
Tanygin

(10) Patent No.: US 8,718,920 B2
(45) Date of Patent: May 6, 2014

(54) SYSTEM AND METHOD FOR DETERMINING EARTH-FIXED TRAJECTORY LAUNCHING FROM WITHIN A SPECIFIED AREA

(75) Inventor: Sergei Tanygin, Malvern, PA (US)

(73) Assignee: Analytical Graphics Inc., Exton, PA (US)

( * ) Notice: Subject to any disclaimer, the term of this patent is extended or adjusted under 35 U.S.C. 154(b) by 51 days.

(21) Appl. No.: 13/348,493

(22) Filed: Jan. 11, 2012

(65) Prior Publication Data

US 2013/0024102 A1    Jan. 24, 2013

Related U.S. Application Data

(60) Provisional application No. 61/431,671, filed on Jan. 11, 2011.

(51) Int. Cl.
*G05D 1/00* (2006.01)
*G05D 3/00* (2006.01)
*B64G 1/10* (2006.01)

(52) U.S. Cl.
USPC ............. 701/301; 701/13; 244/3.1; 244/75.1; 244/171.3

(58) Field of Classification Search
None
See application file for complete search history.

(56) References Cited

U.S. PATENT DOCUMENTS

| | | | | |
|---|---|---|---|---|
| 6,102,334 | A | * | 8/2000 | Claffey et al. ............. 244/158.5 |
| 2003/0014165 | A1 | * | 1/2003 | Baker et al. ....................... 701/3 |
| 2004/0024527 | A1 | * | 2/2004 | Patera ........................... 701/301 |
| 2012/0016541 | A1 | * | 1/2012 | Alfano ............................ 701/13 |

OTHER PUBLICATIONS

T.S. Kelso, "Analysis of the 2007 Chinese ASAT Test and the Impact of its Debris on the Space Environment," 2007 Advanced Maui Optical and Space Surveillance Technologies Conference, Maui, HI, pp. 321-330.
T.S. Kelso, "Analysis of the Iridium 33-Cosmos 2251 Collision," 2009 Advanced Maui Optical and Space Surveillance Technologies Conference, Maui, HI, 10 pages.

* cited by examiner

*Primary Examiner* — Behrang Badii
*Assistant Examiner* — Demetra Smith-Stewart
(74) *Attorney, Agent, or Firm* — The Marbury Law Group, PLLC

(57) ABSTRACT

Determining a launch window from anywhere within a specified area to avoid or minimize close approaches between a launch vehicle and orbiting space objects. A method and apparatus is disclosed for minimizing close approaches, or conjunctions between spacecraft being launched from anywhere within a specified area and other objects in space during the launch and early deployment phase of their lifetime, by defining a launch window, utilizing and identifying launch window blackout times to avoid close approaches of launch trajectories from anywhere within an area with remaining objects in space as noted in a space object catalog.

9 Claims, 6 Drawing Sheets

- Sample each secondary's arc
- Use event detection routine to look for threshold crossing
  - Identifies a conjunction time interval within considered interval

US 8,718,920 B2

SYSTEM AND METHOD FOR DETERMINING EARTH-FIXED TRAJECTORY LAUNCHING FROM WITHIN A SPECIFIED AREA

FIELD OF THE INVENTION

Various embodiments relate generally to space mission planning and launching of satellites and other payloads into space.

BACKGROUND OF THE INVENTION

Recent collisions between resident space objects and debris have been subjects of close examination discussed in "Analysis of the 2007 ASAT Test and the Impact of its Debris on the Space Environment" and in "Analysis of the Iridium 33-Cosmos 2251 Collision" both by T. S. Kelso, presented 2007 and 2009 AMOS Technical Conferences. These events and the growing number of objects in orbit about the Earth have elevated the need for accurate and fast determination of close approaches.

LIST OF FIGURES

SUMMARY OF THE INVENTION

Figure 1:
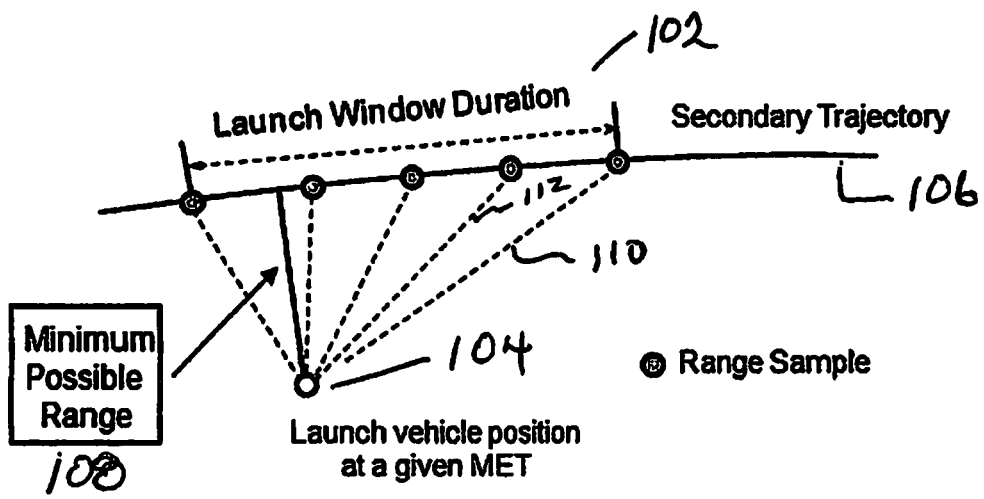
FIG. 1 illustrates the launch trajectory compared to a secondary trajectory.

Various embodiments described herein relate to a solution for the problem of determining suitable launch windows to avoid or minimize close approaches between, on the one hand, a launch vehicle launching from anywhere within a specified area (a primary trajectory), and, on the other hand, satellites and other objects in orbit around the Earth (a secondary trajectory).

There are many ways of defining what constitutes the risk of collision. These definitions range in complexity from the specification of a minimum allowable separation distance between the two objects, to using complex probability density functions to determine the statistical probability of collision during a close approach. Mitigation strategies for a resident space object are different from those for a launch vehicle. A resident space object may be able to change its trajectory by performing an orbit maneuver to avoid an object whereas a launch vehicle typically retains its launch trajectory in the Earth-fixed frame but may change its launch time within some specified launch window to avoid objects in orbit.

Therefore, determining launch opportunities from a stationary launch site involves determining blackout intervals within a launch window during which a launch vehicle will have the unacceptable risk of collision. A different problem arises when planning a launch from a mobile launch platform. In this case it may be necessary to determine blackout intervals for launches from anywhere within some specified area.

One straightforward approach to avoiding a risk of collision is essentially an extension of a single site analysis. It involves creating multiple launch trajectories originating from some finite number of launch sites within the area, determining blackout intervals for each launch site and then subtracting them from the launch window to obtain clear-to-launch intervals representative of the entire area. This approach suffers from a significant drawback: the accuracy of the analysis is proportional to the number of sites within the area. However, the greater the number of sites the more computations must be performed which increases latency of the analysis. In the limit, it would take an infinite number of launch sites and computations to positively identify blackout intervals throughout a launch area.

To overcome this drawback, a method and apparatus are needed that will accurately determine close approaches based on a launch time anywhere within a given launch window and mark off corresponding blackout intervals during that launch window without concern for the sampling frequency and for the totality of all possible launch trajectories originating within a given launch area.

An embodiment illustrated herein provides a method and apparatus for determining close approaches between spacecraft and other objects in space.

Another embodiment illustrates a method and apparatus for determining close approaches between spacecraft and other objects in space, utilizing one or more filters to eliminate from consideration objects that are not candidates for close approaches.

Yet another embodiment illustrates a method and apparatus for determining close approaches between spacecraft and other objects in space during the launch and early post-deployment phase of their lifetime.

Still another embodiment illustrates a method and apparatus for determining close approaches between spacecraft and other objects in space during the launch and early post-deployment phase of their lifetime when launch may occur anywhere within a given launch area.

A further embodiment illustrates a method and apparatus for determining close approaches between spacecraft and other objects in space during the launch and early post-deployment phase of their lifetime when launch may occur anywhere within a given launch area, by defining a launch window; i.e. a time frame during which the launch must begin, and identifying corresponding blackout times during that launch window in a small number of runs.

Still another embodiment illustrates a method and apparatus for determining close approaches between spacecraft and other objects in space during the launch and early post-deployment phase of their lifetime when launch may occur anywhere within a given launch area, by defining a launch window; i.e. a time frame during which the launch must begin, and identifying corresponding blackout times during that launch window in a single run.

Yet another embodiment illustrates a method and apparatus for determining close approaches between spacecraft and other objects in space during the launch and early post-deployment phase of their lifetime when launch may occur anywhere within a given launch area, by defining a launch window; i.e. a time frame during which the launch must begin, and identifying corresponding blackout times during that launch window in a single run, maintaining the ephemeris of the reference vehicle in the Earth-Centered Earth-Fixed (ECEF) reference frame.

A further embodiment illustrates a method and apparatus for determining close approaches between spacecraft and other objects in space during the launch and early post-deployment phase of their lifetime when launch may occur anywhere within a given launch area, by defining a launch window; i.e. a time frame during which the launch must begin, and identifying corresponding blackout times during that launch window in a single run, maintaining the ephemeris of the reference vehicle in the ECEF reference frame and utilizing a program for satellite system analysis that computes close approaches on the basis of satellite databases and user input regarding the resident space objects, the trajectory of a "reference" vehicle, the launch area, the manner in which the reference trajectory is modified when its starting location is moved anywhere within the area, and other parameters.

A method and apparatus for determining close approaches for Earth-fixed launch trajectories from anywhere within a specified area assumes that the launch trajectory of the reference vehicle is known in the Earth-Centered, Earth-Fixed (ECEF) reference frame and that it is known how this trajectory is modified when its starting location is moved anywhere within the launch area. This method allows the user to enter trajectory data for a launch vehicle, enter data for a launch area and select a method for modifying the reference trajectory when its starting location is moved anywhere with the launch area, set other criteria (such as an acceptable range between the reference vehicle and other objects in space) and specify the beginning and end times for the launch window. Drawing upon satellite databases that track space objects, data files and the trajectory parameters and other data entered by the user, the system calculates close approaches for all possible launch times within the window from all possible starting locations within the area in a single run, thereby allowing a decision to launch or not to launch to be made.

DETAILED DESCRIPTION

In general the various embodiments illustrated herein determine the minimal possible distance of a launched vehicle, based upon mission elapsed time (MET), to a secondary trajectory, that is, the trajectory of a cataloged object in space (known as a secondary trajectory). The launch vehicle trajectory is sampled in MET and ECEF. Each MET time corresponds to an interval of civil times with duration equal to the launch window interval.

Figure 11:
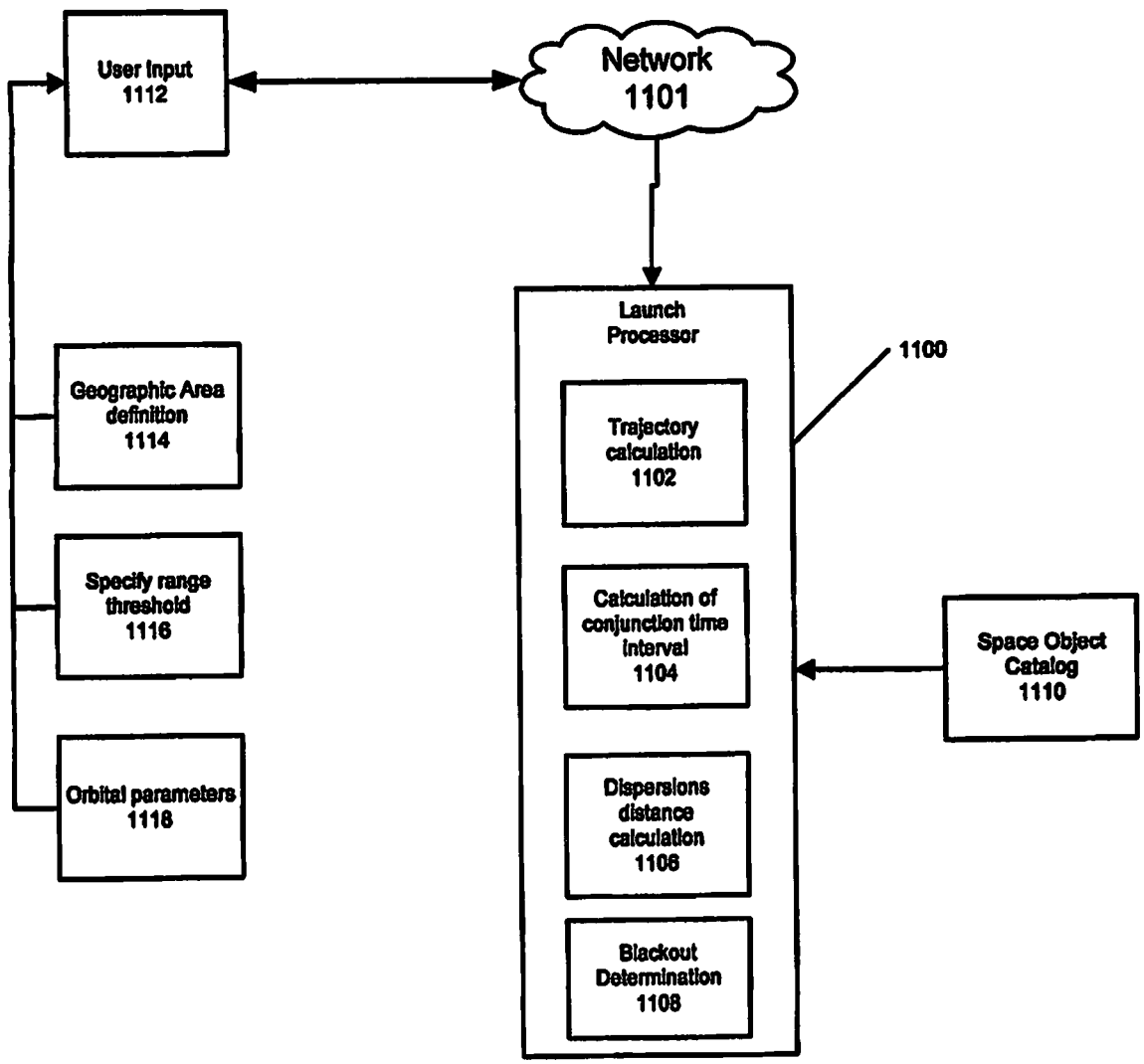
FIG. 11 illustrates the launch processor associated with the various embodiments.

Referring now to FIG. 11, the launch processor 1100 is illustrated. The various embodiments below will be discussed with reference to the various elements of the launch processor. The launch processor comprises a series of instructions that allow the launch processor to receive input from the user 1112. The user input can be a terminal, a laptop, a device directly connected to the launch processor, a mobile device, or other input device is known in the art. The user device 1112 communicates over a network 1101 which may be, but without limitation, a wired network, a wireless network, the Internet, an intranet, or other networks known in the art.

The user inputs a definition of the geographic area from which the vehicle may be launched 1114. The user also specifies a range threshold 1116 that corresponds to a distance from another object that the user is willing to accept as a risk associated with the launch trajectory. For example, the user can specify that a secondary space vehicle or object should be no closer than 100 km to a proposed trajectory of the user's launch vehicle. Further, the user can specify the orbital parameters of the vehicle to be launched. These parameters are input by the user input device 1112 over network 1101 to the launch processor 1100.

The launch processor 1100 takes the user information and makes a trajectory calculation which shows the vehicle pass at various times during the launch phase. The launch calculator 1110 further comprises instructions that allow it to retrieve information from a space object catalog 1110. The space object catalog 1110 comprises a catalog and ephemeris data associated with a myriad of objects that are being tracked in space. These objects can be other satellites, and other objects such as debris, nonfunctioning satellites, and all other manner of "space junk" that is big enough to be tracked by various means known in the art. Typically this information is available from third-party suppliers although this is not meant as a limitation. For example a large government user may keep its own space object catalog to be used in conjunction with the launch processor.

The launch processor further comprises instructions allowing the processor to calculate a conjunction time interval which is the range of time over which the risk of a collision with an existing space object is unacceptably high based upon the range threshold 1116 specified by a user.

The launch processor further comprises instructions allowing the processor to calculate dispersion distances associated with the launch of multiple vehicles from the same geographic area 1114 specified by the user.

Based upon these various inputs from the user, the launch processor and the calculations made as noted above, the launch processor calculates a blackout period(s) 1108 during which, based upon the risk inputs from the user relating to range distances and related risks, a space vehicle should not be launched.

Once the user inputs information to the launch processor the launch processor 1101 calculates a trajectory based upon that input 1112. For example, and referring to FIG. 1 the user may specify a launch window duration 102. The launch processor then samples a number of points on the launch trajectory. In FIG. 1, a specific sampled location of the launch vehicle is illustrated as 104. Using information retrieved from the space object catalog 1110, the launch processor calculates a secondary trajectory 106 of any existing space vehicle or other space object that might be in the vicinity of the trajectory of the user's space object to be launched. Therefore, each point sampled on the launch trajectory 104 in MET corresponds to an arc of the secondary trajectory in civil time (See FIG. 1, 106). This arc can be sampled in civil time and the crossings of the minimum range threshold 108 as well as the shortest distance between the arc and the launch position (for example 112, 110) fixed in MET can be determined by calculating the launch vehicle position at any point in time 104 and the distance from that location to the secondary trajectory arc 106 (See FIGS. 1 and 2).

Figure 2:
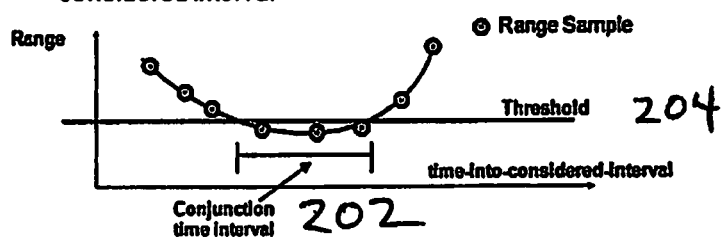
FIG. 2 illustrates an interval in civil time for the specified MET during which the range falls below a threshold.

The interval in civil time for the specified MET during which the range falls below the threshold 204 is called the conjunction time interval 202 (See FIG. 2). Launch processor 1100 comprises instructions that allow the processor to calculate conjunction time intervals 1104. This interval is mapped to the start and stop times in the launch window between which the launch vehicle must have launched for the conjunction to occur. This computation is repeated for a different MET resulting in a different pair of start and stop times in the launch window. Iterative sub-sampling in MET is used to precisely determine the earliest start time and the latest stop time via blackout determination instructions 1108 executed by the processor 1100, in the launch window which bracket the overall blackout interval for this secondary, i.e. the interval within the launch window such that if a launch were to occur anytime within this interval then the launch vehicle would encounter conjunction with the secondary object at some point along its launch trajectory. Thus, this system and method can determine blackout intervals for a single launch trajectory and a single secondary object trajectory.

Figure 3:
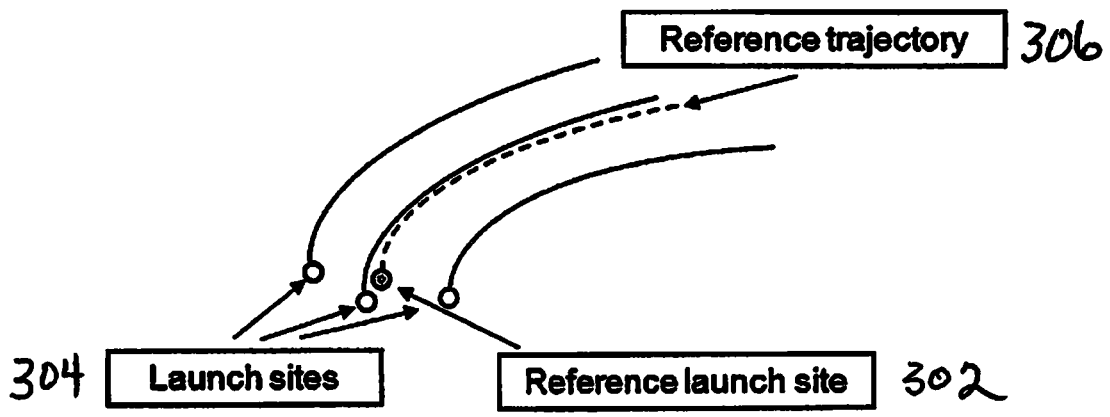
FIG. 3 illustrates establishing a reference trajectory.

Referring now to FIG. 3 the embodiments of the system and method for determining blackout intervals for a trajectory launched from anywhere within a specified area are illustrated. Given the continuum of potential launch sites each with associated launch trajectory, a single launch site 302 within the launch area defined by the user 1114 and trajectory can be selected or defined by the launch processor 1110 as reference. For example, the reference can be the average of the entire continuum as defined in ECEF reference frame 302 (FIG. 3). The launch processor will interact with the user to determine if the user wishes to specify a specific reference launch site or if the user wishes the launch processor to calculate a reference launch site. The launch processor 1100 comprises rules for determining a potential reference launch site. Such rules may be, and without limitation an average of all the potential launch sites 304 or some other methodology associated with the geographic area in question. For example, if there were a large body of water within the launch site, it would be unreasonable to calculate a reference launch site that is in the middle of that body of water. Based upon the reference launch site 302, the launch processor 1100 calculates a reference trajectory 306 using instructions for calculating a launch trajectory 1102 for the launch vehicle launched from that reference launch site 302.

Figure 4:
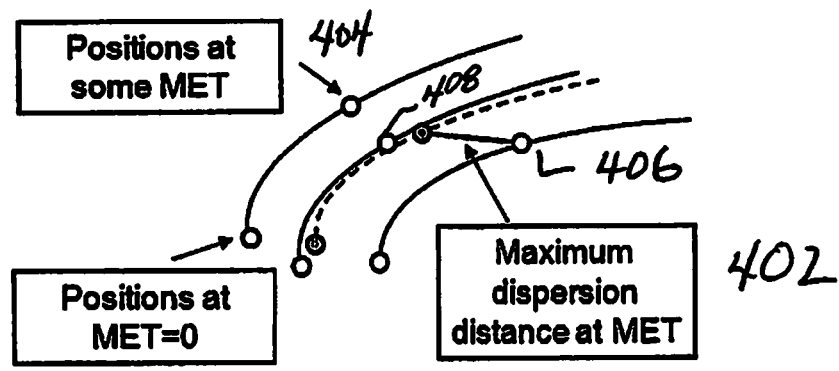
FIG. 4 illustrates a determination of the maximum dispersion distance.

Referring now to FIG. 4 a determination of the maximum dispersion distance is illustrated. The maximum distance at each point in time (mission elapsed time or MET) between the reference launch vehicle and any of the vehicles launched with the specified area is determined. The launch processor 1100 comprises instructions 1106 that allow dispersion distance calculations to be made and provided to the user. In this instance, based upon risk factors input by the user 1112, the launch processor 1100 calculates the positions of multiple vehicles that may be launched from a given area. The launch processor 1100 can receive launch position locations from a user and can make multiple trajectory calculations 1102 of the vehicles that would potentially be launched. Based upon those trajectories, launch processor 1100 determines a maximum dispersion distance 1106 (as illustrated in FIG. 4, 402) for the distances from one vehicle to another. To do so, launch processor 1100 via itch trajectory calculation algorithm 1102 calculates a series of MET positions 404, 406, 4084 different launch vehicles at different METs. The distance does not need to be computed precisely and can be instead conservatively estimated based on the size of the area and the characteristics of the launch trajectories.

It should be noted that a "range threshold," which generally is the range associated with a risk of collision with space objects, is usually calculated by the launch processor 1100 for any particular launch vehicle and associated trajectory as calculated by the launch processor 1100 and itch trajectory calculation algorithm 1102. If a space object comes any closer then this range threshold, based upon a predicted trajectory, a launch will not occur. Thus any position at some MET will also have a range threshold associated with that position.

Figure 5:
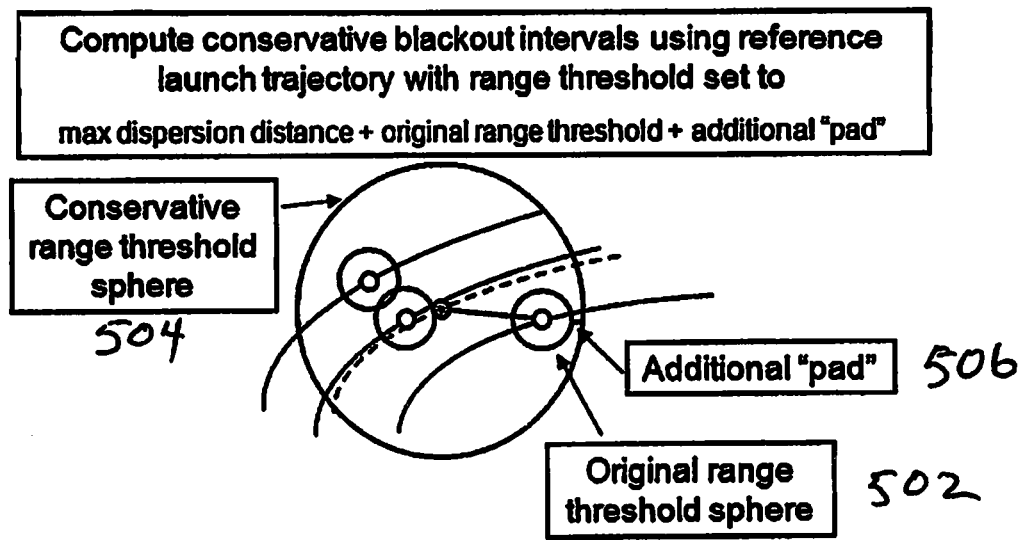
FIG. 5 illustrates computation of a conservative blackout interval.

Referring now to FIG. 5 the computation of a conservative range threshold for the entire continuum of possible launches is illustrated. In this case the launch processor 1100 calculates a maximum dispersion distance via instructions 1106 executed by the launch processor to calculate a dispersion distance (as illustrated in FIG. 4) added to the original range threshold 204, associated with any particular point for a launch vehicle at some MET, plus an additional safety factor (which may change from launch to launch) 506. This gives rise to a conservative range threshold 504. This can be seen from FIG. 5. This conservative range threshold encompasses all range thresholds for all potential launches from a particular area.

By applying the conservative range threshold to the reference launch trajectory, conservative blackout intervals can be determined by the launch processor 1100 via instructions allowing the processor to determine the blackout period 1108 for the entire continuum of launch trajectories at the computational cost comparable to that of conjunction analysis for a single launch trajectory.

For example, in order to use this system and method a user would:

Define the latitude and longitude of a rectangular area

Figure 6:
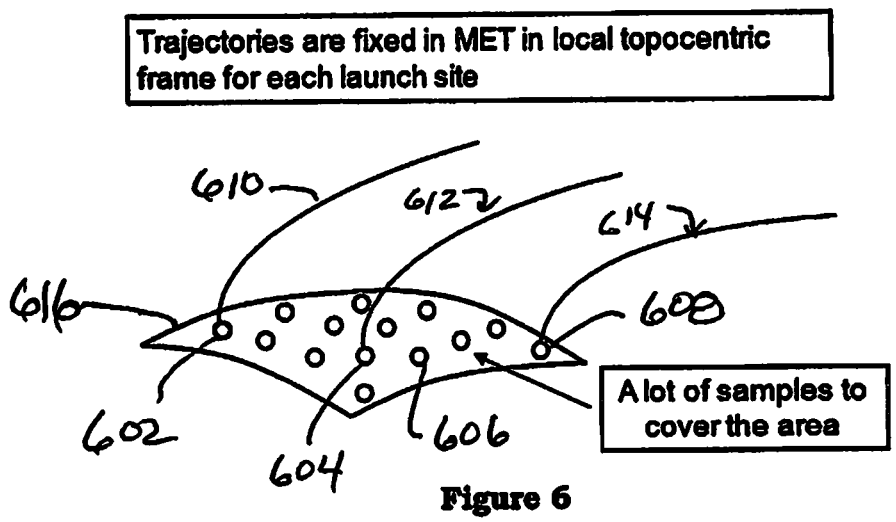
FIG. 6 illustrates launch trajectories populated within the area and fixed in local topocentric frame of their respective launch sites.
Figure 7:
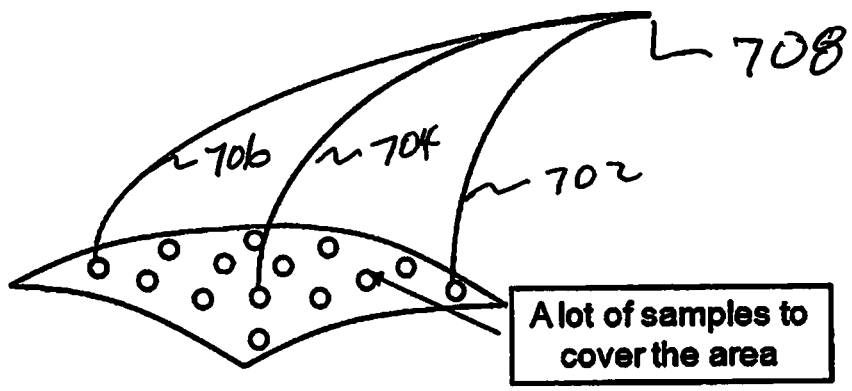
FIG. 7 illustrates how launch trajectories are populated within the area if they share the same burnout point in ECEF MET.

Specify the reference ECEF MET trajectory launching from some reference launch site within the area Define the method by which a launch trajectory is modified when its launch site is varied within the specified rectangular area (see FIGS. 6 and 7)

FIG. 6 illustrates how launch trajectories are populated within the area if they are fixed in local topocentric frame of their respective launch sites. In this illustration, multiple launch sites 602, 604, 606, and 608 (for example) may be designated by a user. Trajectories 610, 612, 614 (for example) are then calculated by launch processor 1100 and using instructions allowing the processor to calculate trajectories 1102 to arrive at multiple launch trajectories for a given geographic area 616.

FIG. 7 illustrates how launch trajectories are populated within the area if they share the same burnout point in ECEF MET. In this illustration, multiple trajectories 702, 704, 706 are shown as being calculated by the launch processor 1100 all of which have the same burnout point 708.

Figure 8:
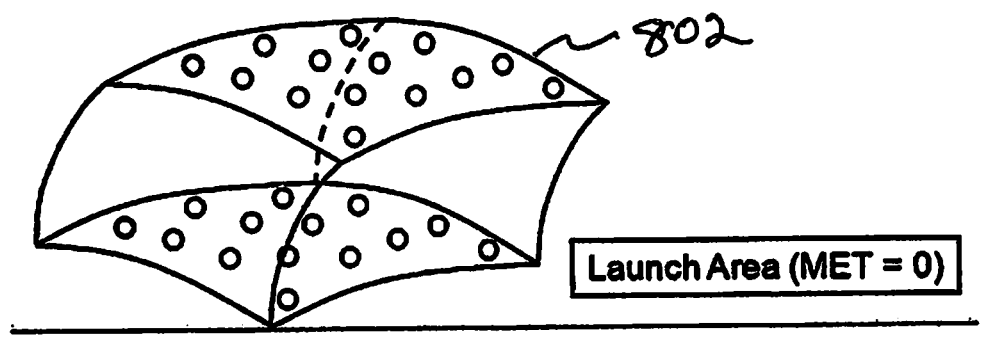
FIG. 8 illustrates here a primary trajectory surface at a given MET.

It is clear that using either of the methods shown in FIGS. 6 and 7, the launch vehicle position along any of the trajectories within the continuum can be encoded using the time in MET and the two coordinates that identify the originating launch site within the specified area. It is also clear that at any fixed MET, there exists a primary trajectory surface, comprising points located at this MET on all launch trajectories within the continuum. In fact, at MET=0, this surface represents the launch area (see FIG. 8). This primary trajectory surface 802 represents a continuum of the multiple launch site locations in space at a specific location and MET above the actual surface where the launch sites exist.

Figure 9:
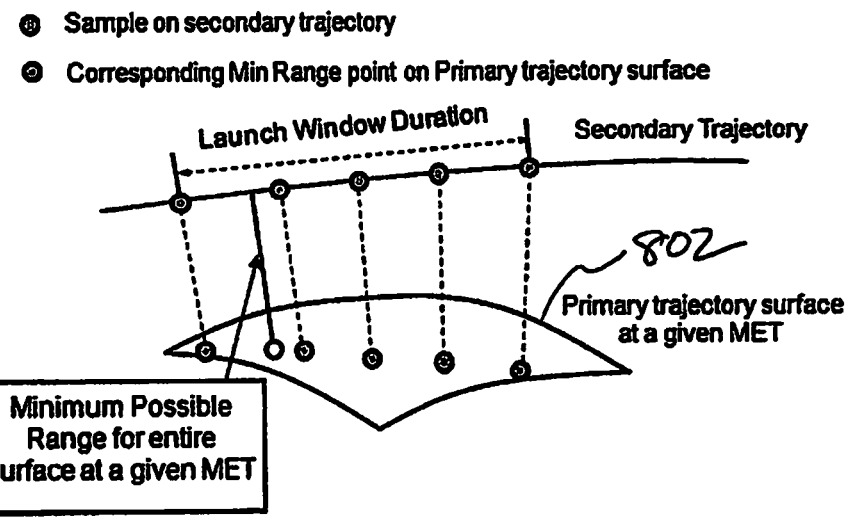
FIG. 9 illustrates the minimum possible distance at a fixed MET determined for the entire primary trajectory surface.

Referring to FIG. 9 and contrasting it to FIG. 1, the minimum possible distance at a fixed MET is determined for the entire primary trajectory surface rather than for a single position as is the case when considering a single launch trajectory. Finding the nearest distance to the primary trajectory surface 802 involves a two dimensional minimization over the primary trajectory surface in which MET is fixed but the other two coordinates encoding the surface are varied.

Figure 10:
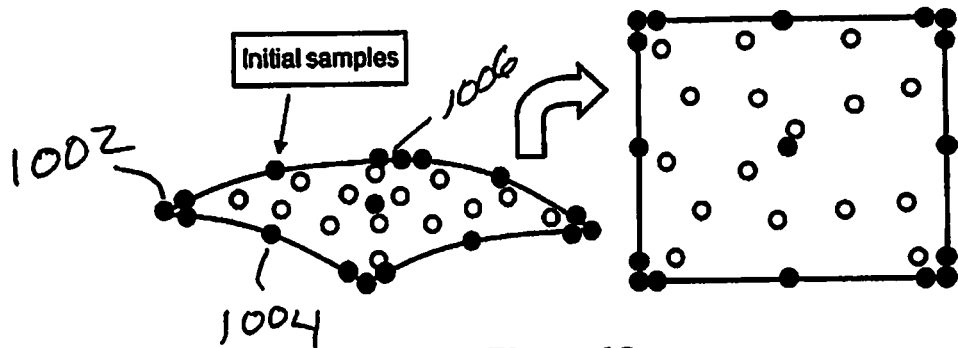
FIG. 10 illustrates judicious sampling over an entire area.

Referring to FIG. 10, a judicious sampling scheme is illustrated. A computational advantage is realized in this case because only relatively coarse initial sampling of the surface is required in order to converge to the nearest point on the surface. The judicious initial sampling by designating selected points 1002, 1004, 1006, (for example) adequately captures two dimensional trending of the distance to the surface allowing fast and accurate convergence for areas of various sizes.

Using this technique, a user can establish a blackout interval for an entire area which will tell a user the period when it is not safe to launch a vehicle from anywhere within a given area. In addition, the company desiring to launch a vehicle can make plans in advance and continually update the results when launch trajectory design changes. This technique also allows for easy resetting of the launch window since a single calculation only needs to be made. As the launch window gets closer, the best available data for the predicted trajectory can then be used to enhance prediction accuracy.

In addition to the advantages noted above, using the embodiments illustrated, a user can plan months in advance of the launch window for any particular payload regardless of the specific location from where the payload may be launched. Further, users can assess the impact of trajectory changes without long computational times. Further, launch windows may slip for a wide variety of reasons. Using the embodiments illustrated above, a new assessment can be rapidly made based upon the potential launch window.

Embodiments noted above used Earth fixed frames rather than inertial frames and use mission elapsed time rather than official civil times. Using these frames, a small number of samples can be used to determine various trends. Further the computational load is lessened since there is no need to sample at small intervals to detect short conjunctions because accurate trending and efficient threshold crossing computations using iterative subsampling can be realized with relatively coarse judicious initial sampling and in relatively few iterations.

The foregoing method descriptions and the various diagrams are provided merely as illustrative examples and are not intended to require or imply that the steps of the various embodiments must be performed in the order presented. As will be appreciated by one of skill in the art the order of steps in the foregoing embodiments may in some cases be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments illustrated herein.

The hardware used to implement the various illustrative logics, logical blocks, and modules described in connection with the embodiments disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

I claim:

1. A method for performing area conjunction analysis comprising:
    establishing by a launch processor a reference trajectory associated with a plurality of potential launch sites for a space vehicle within a particular area;
    creating by the launch processor an area range threshold associated with the reference trajectory, wherein the area range threshold encompasses all range thresholds for all potential launch sites within the particular area;
    evaluating by the launch processor a secondary trajectory associated with an object in space;

calculating by the launch processor a conjunction time interval between the points on the reference trajectory and a secondary trajectory associated with the space object; and establishing by the launch processor a conservative blackout interval for the reference trajectory based upon the range threshold and its conjunction with the secondary trajectory for all potential launch sites within the particular area.

2. The method of claim 1, wherein establishing a reference trajectory comprises the launch processor executing instructions causing the processor to sample the reference trajectory at different points in mission elapsed time (MET).

3. The method of claim 1, wherein creating an area range threshold comprises the launch processor executing instructions causing the launch processor to:
   determine a maximum dispersion distance;
   add a maximum dispersion distance to a range threshold for an individual launch vehicle; and
   add a safety factor distance to the sum of the maximum dispersion distance and the individual range threshold.

4. The method of claim 1, wherein evaluating a secondary trajectory associated with an object in space comprises sampling by the launch processor the location of the space object in the secondary trajectory at multiple points in time during a mission elapsed time period.

5. The method of claim 1 further comprising calculating by the launch processor conjunction intervals based upon the area range falling below a threshold.

6. The method of claim 1, wherein establishing a reference trajectory comprises establishing a plurality of reference trajectories associated with sampled potential launch locations in the particular area.

7. The method of claim 6 further comprising establishing by the launch processor a primary trajectory surface at a given MET.

8. The method of claim 7 further comprising sampling by the launch processor the secondary trajectory and determine a minimum range to the primary trajectory surface.

9. The method of claim 8 further comprising creating by the launch processor an additional blackout interval based upon the conjunction of the sampled secondary trajectory with the primary trajectory surface.

\* \* \* \* \*